June 15, 1948.  C. C. S. LE CLAIR  2,443,394
COUPLING FOR HOSES AND PIPES
Filed May 13, 1944

Inventor,
Camille Clare Sprankling Le Clair,
Frank S. Atkinson,
Attorney.

Patented June 15, 1948

2,443,394

UNITED STATES PATENT OFFICE 2,443,394

COUPLING FOR HOSES AND PIPES

Camille Clare Sprankling Le Clair, Acton, London, England

Application May 13, 1944, Serial No. 535,473 In Great Britain May 26, 1943

5 Claims. (Cl. 285—86)

This invention relates in general to couplings for joining hoses or pipes, but more particularly to couplings of the type in which two ferrules, one at least of which is adapted to be attached to a length of hose or a pipe to be coupled to another hose or a pipe or to a fitting or other apparatus, are held together in pressure-tight engagement by a union nut which screws on to one ferrule and bears upon a collar formed upon the other ferrule.

Known couplings of the type referred to are made in such a way that it is impossible to assemble the union nut on to the part having the collar by passing it over the jointing end of the ferrule, and it is necessary not only to fit the nut from the back but, as a rule, also to do so before the ferrule is attached to the hose or to the pipe. In some cases, especially where high pressure hoses are concerned, even this is impossible because the ferrule attachment is of such large diameter that the nut cannot pass over it.

The object of the present invention is to avoid these disadvantages by providing a coupling of the type referred to in which the parts can be assembled and locked together after the ferrules have been attached to their respective hoses or pipes, or other fittings or apparatus (hereinafter called "hoses or pipes"), the construction being such that once the parts are assembled, and irrespective of whether the two ferrules are coupled together or not, none of the parts of the coupling can be separated and get lost.

In order to achieve this object, according to the present invention, in or for a coupling of the type referred to, I provide a coupling device comprising a ferrule, a collar made separate from the ferrule and loosely associated therewith, and a union nut made in two parts adapted to be assembled after they have been passed over the joint face or end of the ferrule, the construction being such that when the parts are assembled, the said collar is held in position on the ferrule and cannot be detached as long as the two parts of the nut are assembled.

In one constructional form of ferrule, the said joint face or end is formed upon a cylindrical part of the ferrule which is coaxial with, and projects away from, the part of the ferrule to which the hose or pipe is attached, and the said loose collar is arranged in an annular groove formed in the cylindrical part. To facilitate assembly, the loose collar is made in two parts but if so desired, it may be made in a number of segmental parts. In the same construction, the union nut comprises an inner part which is slidably and turnably arranged upon the said cylindrical part of the ferrule, and an outer part which is detachably attached to the inner part and is formed internally to receive and retain the end of another coupling device or ferrule or other fitting or apparatus, which end is formed with a complementary joint face or end adapted to make sealing engagement with the joint face or end on the first mentioned ferrule by the tightening of the union nut.

The outer part of the union nut may be threaded internally to engage with an externally-threaded part of the inner part of the nut, means being provided for locking the two parts of the nut against relative rotation. Thus, the inner part of the union nut may be formed with a flange or shank which is overlapped by a thin sleeve-like portion of the outer part of the nut, and part of the sleeve-like portion may be swaged into a notch formed in the said flange or shank, thereby preventing relative rotation of the inner and outer parts of the nut.

The outer part of the union nut may be formed with an internal thread on the side of the loose collar remote from the inner part of the nut to receive the externally threaded end of another coupling device or ferrule or other fitting or apparatus. The said internal thread may be of such a diameter that it acts to prevent the loose collar becoming disengaged (in a radial direction) from its groove in the ferrule thus preventing its loss.

One constructional form of the invention, applied to a coupling device for use in coupling a length of flexible hose to a ferrule attached to another length of flexible hose, or in coupling a length of flexible hose to another fitting or apparatus, is shown, by way of example, on the accompanying drawing, whereon:

Figure 1:
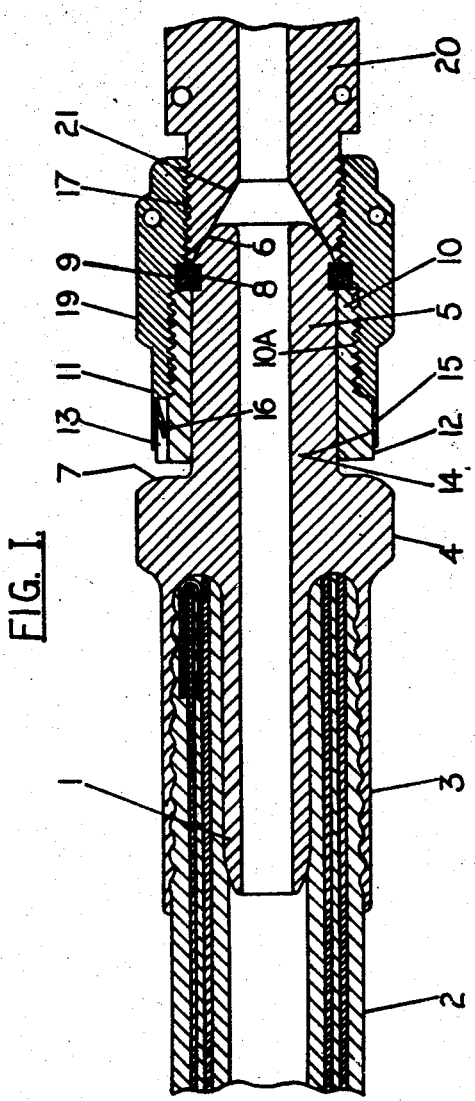
Fig. 1 is a sectional view of the coupling.

Referring to the drawings:

The ferrule of the coupling device comprises a hollow cylindrical spigot 1, which is inserted into the flexible hose 2 and is a tight fit therein, surrounded by an external skirt 3 which is fluted internally and which passes outside the hose and is then swaged down on to the hose so that the hose is effectively gripped between the spigot 1 and the skirt 3.

External to the hose in an axial direction the ferrule is formed with a hexagonal part 4 to which a spanner may be applied and from which there projects a hollow cylindrical part 5 which terminates in a conical or spheroidal joint face 6.

The diameter of the cylindrical part 5 is less than the width across the flats of the hexagonal part 4 and a shoulder 7 is formed at the junction of the latter and the cylindrical part. An annular groove 8 is cut in the outer surface of the said cylindrical part adjacent to the inner end of the said joint face 6 and into this groove is fitted a loose washer or collar 9 which, for the purpose of assembly, is made in two semi-circular halves.

The coupling device also comprises a hollow union nut made in two parts, namely an inner part 10 which is an easy slidable and turnable fit on the said cylindrical part 5 and is slightly less in length than the distance between the aforesaid shoulder 7 and the two-part collar 9, so that it lies between them with a small endwise clearance. The inner part of the nut is screw-threaded externally at 10A over part of its length to engage with the internally screw-threaded end of the other or outer part 11 of the nut. That end of the inner part 10 of the nut which is adjacent to the said hexagonal part 4 of the ferrule is left unthreaded and thus forms a shank 12 which is of a diameter not less than the top of the thread of the threaded portion and is formed with a longitudinal notch 13.

Figure 2:
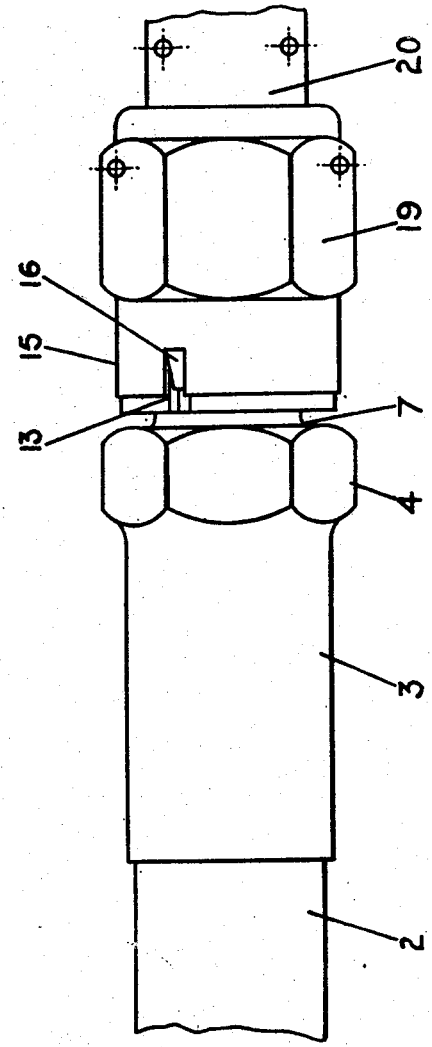
Fig. 2 is an outside elevation of the coupling.

The outer part 11 of the union nut is threaded internally over part of its length to engage with the thread of the inner part 10, and that end of the thread in the outer part which is adjacent to the said hexagonal part 4 of the ferrule is counterbored at 14 to fit over the said unthreaded portion or shank 12 of the inner part. The counterbored end 14 thus forms a thin metal extension 15 which overlaps the said shank 12 and can be swaged into the aforesaid longitudinal notch 13 as shown at 16 in Fig. 2, in order to lock the two parts 10 and 11 of the nut together.

The remaining portion of the bore of the outer part of the union nut is also threaded internally at 17 and this thread, as explained hereinafter, is adapted to engage with the threaded part of another ferrule or other fitting or other apparatus. The thread may be either larger or smaller or of the same size as the thread in the other part of the bore of the outer part 11 of the union nut.

The outer part of the union nut is cylindrical over that part of its length or some of it which overlaps and is adjacent to the said shank 12 of the inner part and the remaining part, or some of it, of the outer part of the nut at 19 is hexagonal in shape.

From the adjacent ferrule or other fitting, or apparatus, or other part which is to be attached to the coupling device, there projects a hollow cylindrical part 20, generally rather larger in diameter than the cylindrical part 5 on the first mentioned ferrule, which cylindrical part is screw-threaded externally to engage with the internal thread 17 formed in the outer end of the bore of the outer part 11 of the union nut. The outer end of this cylindrical part 20 is formed with a recessed conical seating 21 which joints with the conical end 6 of the first mentioned ferrule.

In assembling a coupling device made up of the above described parts, the inner part 10 of the union nut is first arranged on the projecting cylindrical part 5 of the ferrule and the two halves of the split collar 9 are then inserted into the groove 8 in said cylindrical part. The appropriate end of the outer part 11 of the nuts is then passed over the split collar 9 and is screwed fully onto the inner part. The said thin extension 15 on the outer part is then swaged at 16 into the longitudinal groove 13 of the inner part, thereby locking the two parts together.

The relative sizes of all the parts are so chosen that the split collar 9 cannot disengage from its groove 8 while confined by the outer part 11 of the union nut.

Further, as long as the split collar 9 is in position, the union nut cannot be removed over the jointing end 6 of the ferrule and it cannot slide back in the opposite direction because it is opposed by the said shoulder 7 of the hexagonal part 4 of the ferrule.

The parts of the coupling device being assembled as described, the jointing face 6 and the jointing face upon the cylindrical part 20 of the adjacent ferrule or other fitting or apparatus can be pulled together by tightening the union nut only upon the thread of the said part. As there need be no relative angular movement between the faces, there need be no damage to the faces due to abrasion.

In a modification in which the coupling device is adapted to be attached to a metallic pipe instead of to a hose, not only is there no necessity for a hexagonal part 4 but if the pipe is thinner than the hose and there is no external skirt 3, the abovementioned shoulder 7 may be eliminated, thus permitting the union nut assembly when uncoupled from the other ferrule or other fitting or apparatus, to slide backwards along the pipe and thus free the parts of the split collar.

To prevent this, either the internal thread 17 in the outer end of the outer part 11 of the union nut, which engages with the thread on the adjacent ferrule, or other part, may be made of a smaller diameter than the thread of the inner end which engages with the inner part 10 of the union nut, or a shoulder may be formed which engages loosely with the split collar 9 and thus prevents the union nut assembly sliding backwards along the pipe and thus disengaging the two halves of the split collar and permitting of their separation and loss.

It will be appreciated that a coupling device made up of parts as described above is applicable to joining two lengths of hose or pipe together and also to joining a hose to a container or to an elbow, T piece, valve body or other apparatus.

It will also be appreciated that if two hoses to be coupled have been fitted with coupling devices comprising the split collars 9 and union nuts, they may be joined by means of a double-ended nipple or adapter, each end comprising a threaded cylindrical member 20 terminating in a recessed seating 21 as previously described. Such a nipple or adapter may, if preferred, be formed with a hexagonal part.

Such hexagonal parts and/or the hexagonal parts 4 referred to above may, of course, be replaced by square or other spanner-fitting parts or with knurled parts or cylindrical parts formed with recesses to fit projections on tools.

Further, the cylindrical part 5 of the coupling device may be formed with a recessed seating, like the seating 21, instead of with a protruding jointing face or end.

I claim:

1. A coupling of the type referred to, comprising a coupling device including a ferrule having a joint face or end for making a joint with the joint face or end of a second ferrule, a seating formed externally upon the first mentioned ferrule, a collar made separate from the first mentioned ferrule and detachably mounted in said seating, and a union nut comprising two detachable parts adapted to be assembled after the inner part has been passed over the joint face or end of the first mentioned ferrule and the separate collar is mounted in its seating, whereby when the parts are thus assembled, the said collar is held in position in said seating upon the first mentioned ferrule and cannot be detached as long as the two parts of said union nut are assembled.

2. A coupling device as claimed in claim 1, in which the coupling has a cylindrical part and wherein the union nut comprises an inner part which is slidably and turnably arranged upon the said cylindrical part of the ferrule, and an outer part which is detachably attached to the inner part and is formed internally to receive and retain the end of another ferrule or other fitting or apparatus, which end is formed with a complementary joint face or end adapted to make sealing engagement with the joint face or end on the first mentioned ferrule by the tightening of the union nut.

3. A coupling device as claimed in claim 1, wherein the union nut comprises an inner part which is slidably and turnably arranged upon the said cylindrical part of the first mentioned ferrule, and an outer part which is detachably attached to the inner part and is formed internally to receive and retain the end of another second mentioned ferrule or other fitting or apparatus, which end is formed with a complementary joint face or end adapted to make sealing engagement with the joint face or end on the first mentioned ferrule by the tightening of the union nut, and wherein the outer part of the union nut on that side of the said collar adjacent to the hose or pipe which it attached to the first mentioned ferrule is screwed internally to engage with an externally threaded part of the inner part of the nut, means being provided for locking the two parts of the nut against relative rotation.

4. A coupling of the type referred to, comprising a coupling device including a ferrule having a joint face or end for making a joint with the joint face or end of a coaxial conduit, the said coaxial conduit being externally threaded at its end next to the ferrule, a seating formed externally upon said ferrule, a union nut comprising two detachable parts, one of which is fitted on the ferrule and has its outer end terminating approximately at the inner edge of the seating, the said part being provided with external threads at its outer end, the other part of said union nut having a greater diameter toward its inner end than at its opposite end, the said second mentioned nut part having internal threads engaging the threads of the first described part and internal threads near its outer end engaging the threads of the coaxial conduit, a shoulder formed between the parts of the nut of different diameters, a collar separable from the ferrule located in the seating engaged by the end of the first mentioned part of the union nut and by the shoulder of the second mentioned part of the union nut where the internal diameter of the second mentioned part of the union nut is reduced, so that when the parts are assembled, said collar is held in position in said seating upon the ferrule and cannot be detached as assembled.

5. A coupling device as set forth in claim 1, in which means are provided for locking the two parts of the nut together, said means comprising a member forming one part of the nut swaged into a notch in the other part of the nut.

CAMILLE CLARE SPRANKLING LE CLAIR.

REFERENCES CITED

The following references are of record in the file of this patent:

UNITED STATES PATENTS

| Number | Name | Date |
| --- | --- | --- |
| 609,509 | Jensen | Aug. 23, 1898 |
| 1,069,916 | Windsor | Aug. 12, 1913 |
| 1,082,993 | Beattie | Dec. 30, 1913 |
| 1,913,030 | Hux | June 6, 1933 |
| 2,026,166 | Guarnaschelli | Dec. 31, 1935 |
| 2,300,464 | Parker | Nov. 3, 1942 |

FOREIGN PATENTS

| Number | Country | Date |
| --- | --- | --- |
| 181,280 | Great Britain | 1922 |